United States Patent [19]

Snyder

[11] Patent Number: 4,845,887
[45] Date of Patent: Jul. 11, 1989

[54] SCENTED MOUSE TRAP

[76] Inventor: Kenneth Snyder, P.O. Box 1446, Detroit Lakes, Minn. 56502

[21] Appl. No.: 197,211

[22] Filed: May 23, 1988

[51] Int. Cl.⁴ ............................................. A01M 23/10
[52] U.S. Cl. ........................................... 43/71; 43/69
[58] Field of Search .................... 43/71, 65, 69, 70, 64

[56] References Cited

U.S. PATENT DOCUMENTS

| | | | |
|---|---|---|---|
| 710,020 | 9/1902 | Short | 43/71 |
| 1,050,220 | 1/1913 | Link | 43/71 |
| 2,504,359 | 4/1950 | Tabin | 43/64 |
| 2,706,361 | 4/1955 | Peterson | 43/69 |
| 3,528,191 | 9/1970 | Hand | 43/64 |
| 4,241,531 | 12/1980 | Nelson | 43/69 |

FOREIGN PATENT DOCUMENTS

| | | | |
|---|---|---|---|
| 835599 | 12/1894 | Fed. Rep. of Germany | 43/71 |
| 22007 | 8/1904 | United Kingdom | 43/71 |

*Primary Examiner*—Gene P. Crosby
*Attorney, Agent, or Firm*—Douglas L. Tschida

[57] ABSTRACT

A floor recess mountable trap including a plurality of scented, access channelways leading to an interior containment cavity whereat a rotatable, vaporizer, attractor member is mounted in displaced relation to the channelway exits. Depending upon the recess depth, a ramp collar maybe used. A one-way valve member prevent escape from the cavity.

13 Claims, 3 Drawing Sheets

SCENTED MOUSE TRAP

BACKGROUND OF THE INVENTION

The present invention relates to mouse traps and, in particular, to an unattended trap capable of disposing of large quantities of rodents such as mice and rats.

A problem plaguing the rural property owner each year with the coming of winter is that of rat and mouse infestation. This problem can become especially acute for the absentee owner, since over a protracted period of time, the mice rats can do extensive property damage. Conventional pest control techniques such as poison and resettable mouse/rat traps are ineffective during these times, since the pests are continually breeding and can re-populate the premises before the owner returns to reset or re-bait any traps/poison which may have been left about the premises. A need therefore exists for a control device which may be left unattended for long periods of time and which accommodates large quantities of pests before cleaning is necessary.

Although applicant is aware of many conventional poison bait stations, the operating principle of these devices is to provide a protected feeder station whereat a delayed acting poison is distributed to the rodents, which expire at other locations, most notably any nearby denning area. While such a control measure is very effective for a small rodent population, for larger concentrations, a containment/collection mechanism is preferred. Decomposition and odor problems are thus confined to an owner selected location.

Baited traps, in contrast, provide advantages in the later regard, since the captured rodents are readily locatable. With most traps, however, required periodic resetting or re-baiting is not practical, where the owner may be gone for several weeks or months.

SUMMARY OF THE INVENTION

The subject invention accordingly seeks to provide a trap which accommodates a large quantity of rodents without re-baiting or cleaning, which features provide for a prolonged set life. Such devices find particular application with owners of vacation property and rural storage buildings.

It is accordingly a primary object of the subject invention to provide a trap having a large storage or containment compartment and requiring only infrequent baiting or cleaning.

It is a further object of the invention to provide one or more scented channelways for controlled ingress and a rotatable, scented attractor mechanism.

It is a further object of the invention to provide a smooth-walled, large capacity containment area with a one way ingress thereto and an associated removable cover for cleaning and dumping.

Various of the foregoing objects and advantages of the invention are particularly achieved in one construction which comprises a relatively large, plastic, wastebasket like enclosure which is mountable within a floor recess such as a heat or cold air return register. Access thereto is controlled via a cover member and at least one tubular channelway formed through the enclosure wall which is adapted to be painted with aromatic seed oils.

An internally mounted vaporizer or attractor member including a seed oil absorbant pad mounted within an interior ported cavity attracts the rodents. The vaporizer is mounted in displaced, rotatable relation to the channelway exits and in an embodiment includes finned ridges which suggest a firm foothold. The positioning of the vaporizer is however such that any additional weight induces rotation and slippage with the rodent falling into the containment cavity.

Where a floor recess is unavailable, a ramped collar leads the rodents to the channelways. A low-profile container may also utilize one or more one-way valve members beneath the vaporizer attractor.

DESCRIPTION OF THE PREFERRED EMBODIMENT

Figure 1:
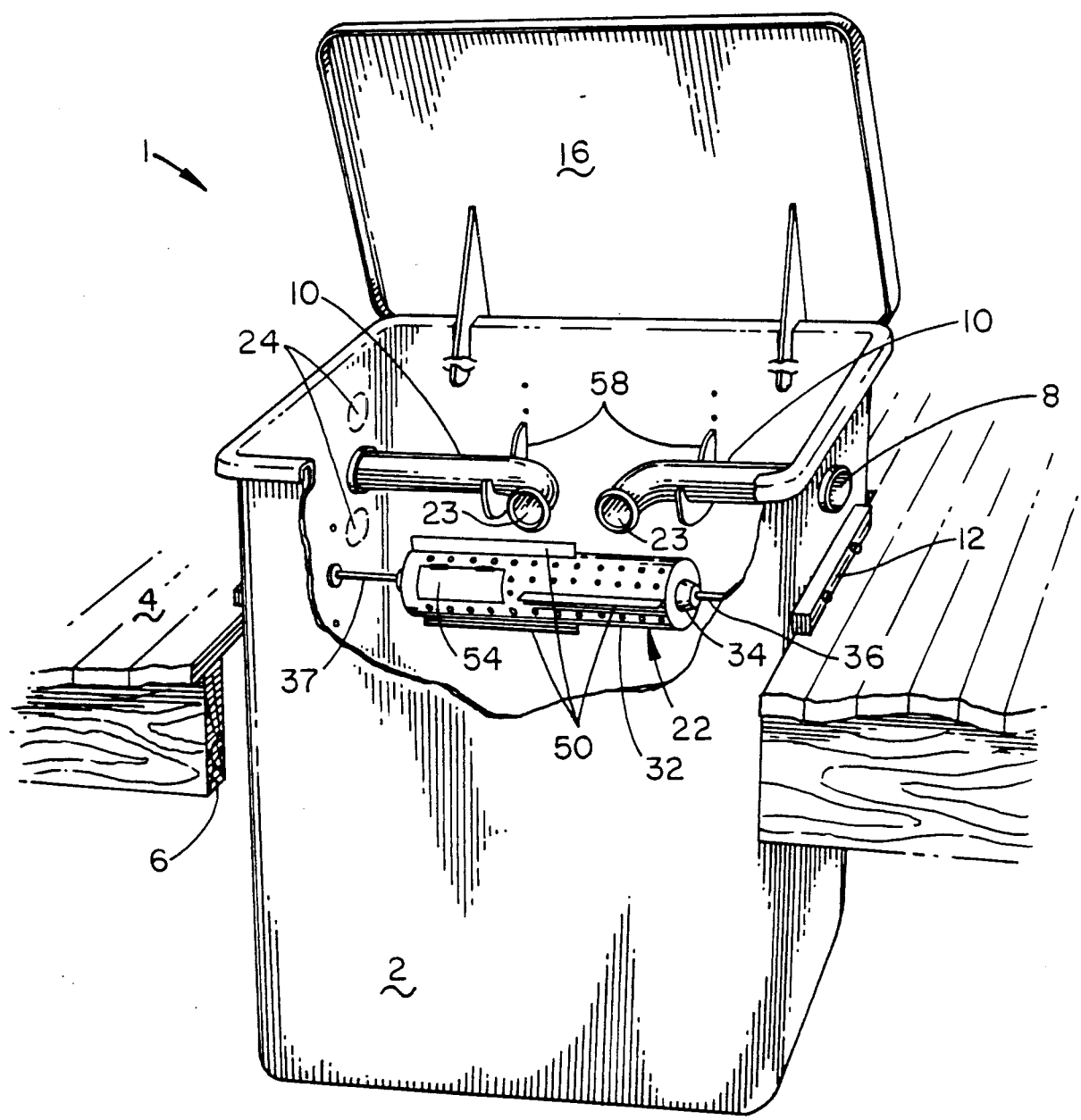
FIG. 1 shows an isometric view in partial cutaway of the present trap relative to a typical floor mounting.

Referring to FIG. 1, an isometric view is shown of the present mouse trap 1 as it would appear in its typical use. That is, the trap enclosure or housing 2 is recessed into a floor surface 4, such as at a hot air or possibly a cold air return register opening 6. When so mounted, the openings 8 to the trap's tubular channelways 10 are positioned adjacent the floor 4 to facilitate entry thereto by a rodent. Ideally, the channelways openings 8 align with the floor surface, although might be raised above the floor three to six inches. The specific height can be adjusted by varying the mounting position of the stop members 12 mounted to the right and left sides of the enclosure 2 and/or the mounting location of the channelways 10.

As depicted, the enclosure 2 might comprise a plastic wastebasket-like housing 2 having a removable lid 16. Alternatively, the enclosure may be constructed of a formed metal, but a plastic housing is preferred in that with prolonged inattention, the housing 2 can corrode as the captured rodents decompose.

In any event, the relative dimensions of the housing are sized to fit the greatest number of floor openings. Where the enclosure dimensions are significantly smaller than the cutout, adjustable spreader bars 18 (reference FIG. 2) may be mounted to the enclosure 2 in lieu of the stops 12 and be extended to contact the inner joist surfaces whereat they are fastened with appropriate fasteners 14, such as screws or the like, which are used to secure the spreaders 18 to the enclosure 2. As necessary, a ramped collar 20 (reference FIG. 3) may also be mounted about the enclosure 2 to cover the open side spaces and again facilitate rodent entry.

Depending upon where the enclosure 2 is to be mounted, different height enclosures 2 may be required. That is, depending upon the duct work and its manner of mounting relative to the floor cutout 6, the channelway openings 8 may have to be lowered and/or different height collars 20 may have to be mounted about the enclosure 2. It is preferable though that the channelway openings 8 be maintained as high as possible along the enclosure 2 to provide as great a separation as possible between the interior vaporizer, attractor assembly 22, such that the rodent may not reach the internal exits 23 to the channelways 10, such as by jumping, etc. The exits 23 may also be formed with a slight outward, smooth flare angle to minimize the possibility of gaining a foothold in such circumstance.

Figure 2:
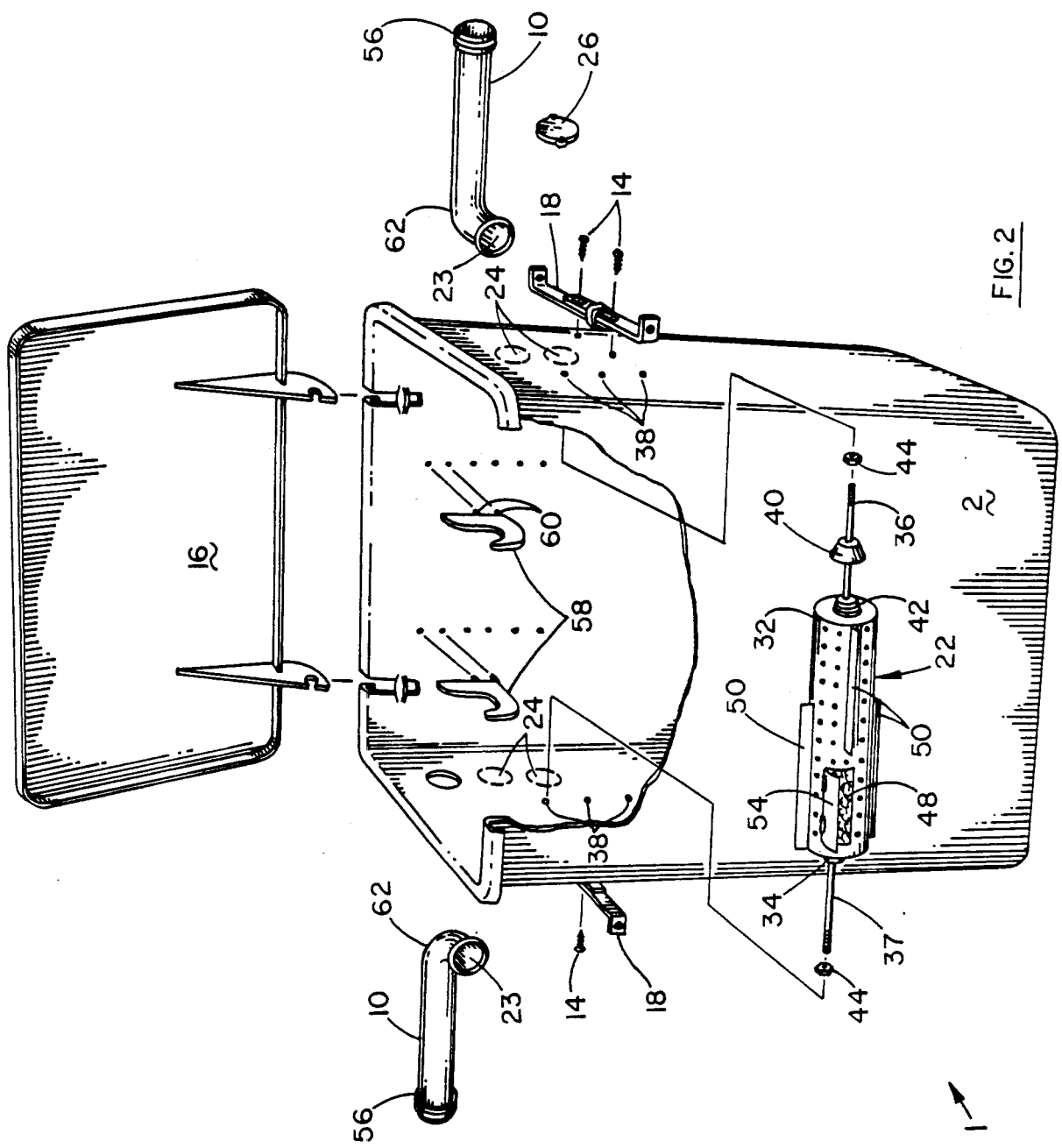
FIG. 2 shows a detailed isometric view in exploded assembly of the various piece parts of the invention.

Referring also to FIG. 2 and appreciating the variety of mounting circumstances which may present themselves, a number of knockouts 24 are also provided in the sides of the enclosure 2. Depending upon the mounting condition, the proper knockout 24 is removed. If the wrong knockout 24 is removed, a screw fastened cap member 26 may be mounted thereover. Thus, the property owner may arrange the trap 1 to fit the available floor openings 6 and fit the channelways 10 to a the proper relative height to the floor surface 4. In short, even though a relatively tall enclosure 2 is provided a preferable in the present applications, the owner may tailor the trap 1 to the particular trap site.

Mounted interiorly of the enclosure 2 and displaced away from and below each of the flared exits 23 of each channelway 10 is a rotatably mounted attractor or vaporizer assembly 22. The vaporizer assembly 22 generally comprises a tubular member 32 which is capped at each of its ends and whereat end bearing supports 34 are provided for right and left stub axles 36, 37 which extend between the vaporizer 32 and holes in the walls of the enclosure 2. The stub axles 36, 37 are set within drilled holes 38 in the enclosure side walls. During manufacture and with the forming of the various knockouts 24, a number of axle mounting holes 38 are also let into the enclosure walls at predetermined spacings from the knockouts 24 and, thus, as the proper pairs of knockouts 24 are selected, so too is the proper relative position of the vaporizer 22 determined with the selection of the associated holes 38. Alternatively, the property owner may re-position the vaporizer assembly 22 by merely drilling additional holes 38.

Upon assembly, each of the stub axles 36, 37 is inserted into one of the bearing members 34 which provide for a threaded compressive coupling to the axles 36, 37. That is, the end of each stub axle is inserted through a threaded outer cap 40 which is secured to a mating threaded portion 42 secure extending from the body of the vaporizer 32. Upon drawing the threaded caps 40 tight, each stub axle 36, 37 is secured via a tapered, compressive action to the vaporizer body 32.

The relative length of the mounted stub axles must also be sized to the enclosure 2 which requires that the overall length of the attractor assembly 22 be approximately one inch longer than the width of the enclosure 2. The stub axles thus extend approximately one-half inch to each side of the enclosure. Washer/nuts or pinch-on end caps 44 mount over the exposed ends and secure the vaporizer assembly 22 in confined rotatable relation to the enclosure 2. If a smaller enclosure is used, the axles 36, 37 must be cut to length.

Figure 3:
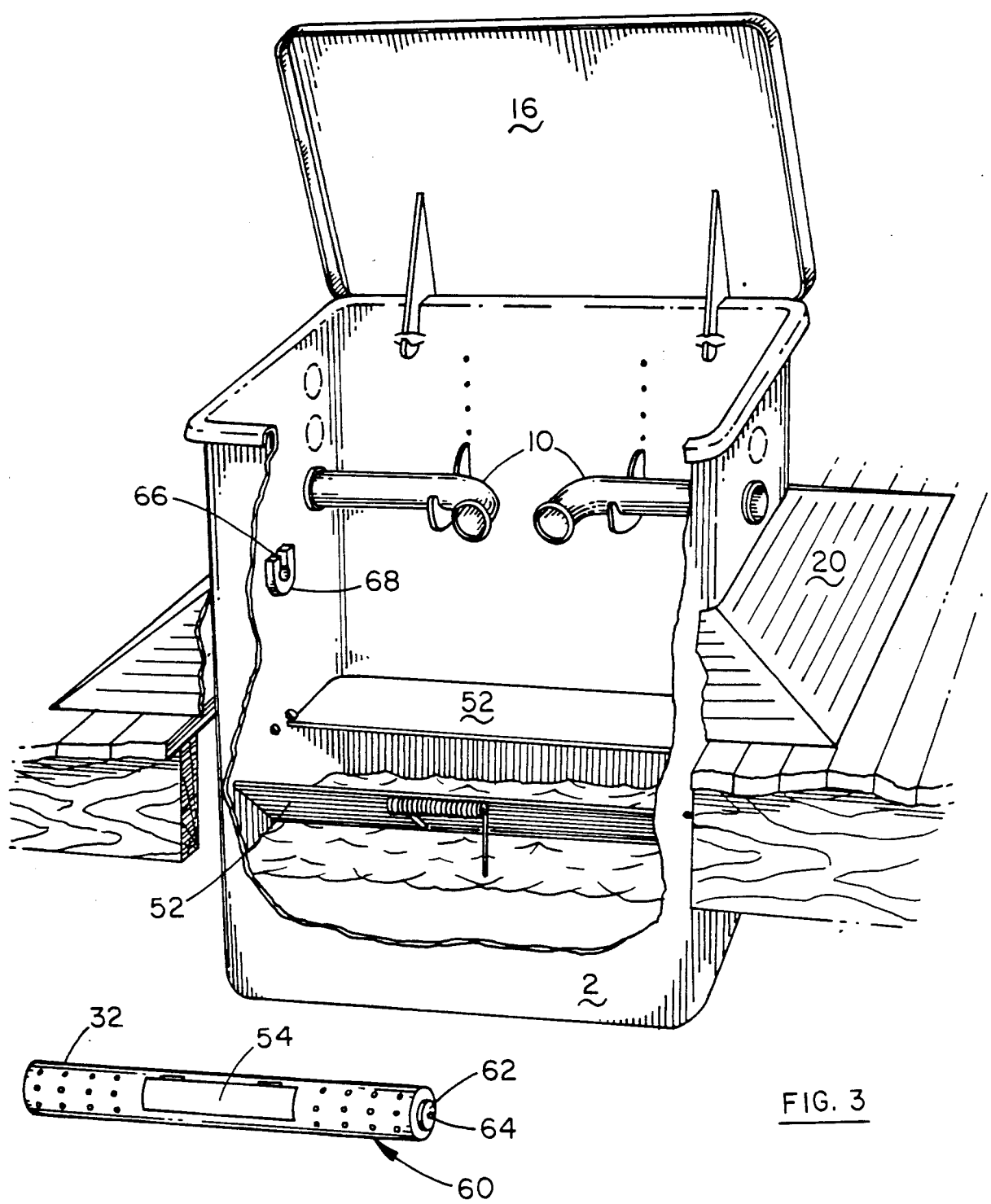
FIG. 3 shows an isometric view in partial cutaway of an alternative low-profile, ramped construction of the invention with one-way valve members.

The body of the vaporizer is formed of a capped tubular member 32 which includes a plurality of apertures 46 formed in the sidewalls adjacent an interiorly positioned absorbent pad 48. Radiating from the body 32 and extending inwardly from each of the opposite ends to the center are a plurality of fin members 50. The fins 50 extend away from the outer surface of the vaporizer 30 approximately ½ to 1 inch to create an appearance to the rodent of a secure foothold. The fins 50 are also positioned relative to one another to provide a balanced equilibrium when the vaporizer is positioned within the enclosure 2, but rotate as soon as the slightest weight is added. Thus, upon a rodent leaping to the vaporizer attractor 22, the vaporizer 22 rotates and the rodent falls to the bottom of the enclosure 2. There the rodent is contained, since even if able to jump to the vaporizer 22, it merely rotates to deny a foothold; and if able to reach the channelway exits 23, the smooth flared surface prevents grasping. Over time, the contained rodent expires from starvation, fighting with other trapped rodents, etc.

Where a relatively low-profile enclosure 2 is used, one or more interiorly-mounted, pivoting, one-way valving members might be positioned beneath the vaporizer 22 in the fashion of FIG. 3 such that the rodent falls therethrough. As depicted in FIG. 3, this might comprise a pair of coacting, spring-biased, flappers 52 or a smooth funnel shaped slideway (not shown). The bottom of the enclosure 2 might also be filled with water to drown the captured rodents.

The center portion of the attractor 30 also includes a hinged/latched cover 54 whereby access is gained to the absorbent pad 48 mounted therebeneath. When setting the trap, the property owner normally opens or removes this cover 54 to expose the absorbent pad 48 which is soaked with a suitable seed or grain oil, such as sunflower oil or any number of other scented, long-lived oils which are appealing to the rodent sought to be trapped. Upon re-insertion into the vaporizer body 32, the aroma permeates the surrounding environment and attracts the rodent. The channelways 10 may similarly be coated with a film of the oil to further attract the rodents. Alternatively, too, peanuts or other high oil content foodstuffs or soaked foodstuffs might be placed within the vaporizer body 32. The cover 54 thus prevents spillage and, over time, the oil scent continues to attract rodents.

In passing, it is to be noted that the opening ends 8 of each channelway 10 includes a groove and/or stop shoulder 56 which firmly receives the enclosure wall as the tapered opening end is inserted through the opening left upon removal of the knockout 24. J-shaped hangers 58 having pairs of stub projections 60, in turn, frictionally mount to holes let in the rear enclosure wall and support the inner 90 degrees bent ends 62 of the channelways. The bends 62 may be deleted, if desired.

Redirecting attention to FIG. 3, a view is shown of a trap like that of FIGS. 1 and 2 but providing for the mentioned ramped collar 20 and a pair of flapper-acting valving members 52 beneath the vaporizer 60. For this embodiment, it is also to be noted that a small amount of water may be added to the bottom of the trap to drown the captured rodent.

Otherwise, it is also to be appreciated that in lieu of using stub axles 36, 37, the vaporizer assembly 60 includes a pair of end-mounted dimple members 62. The dimpled ends 64 of the members 62, in lieu of mounting through holes 38 in the enclosure 2, are received in slotted channels 66 provided in U-shaped channelways 68 which are mounted to the enclosure walls. The relative position of the vaporizer may thus be varied by merely re-positioning the channelways 60.

Also, it is to be noted that the vaporizer 60 does not include fins 50 and instead provides for a smooth cylindrical surface over its length. The hinged cover 54 is also mounted at the center of the vaporizer 60.

While the invention has been described with respect to its presently preferred embodiments and various presently considered modifications thereto, it is to be appreciated that still other modifications may suggest themselves to those of skill in the art. Accordingly, it is contemplated that the following claims should be interpreted to include all those equivalent embodiments within the spirit and scope of the above described invention.

What is claimed is:

1. A rodent trap comprising:
   (a) a high-profile enclosure having smooth side and bottom walls and a removable lid member and including a plurality of ingress apertures let through the enclosure side walls;
   (b) a tubular attractor member including an internal cavity to which a plurality of apertures through the attractor walls open and a cover member mounting over a portion of the cavity and providing access thereto; and
   (c) axle means for rotatably mounting said attractor to the enclosure side walls.

2. Apparatus as set forth in claim 1 including at least one tubular channelway mountable to one of said ingress apertures in interiorly extending relation to said enclosure.

3. Apparatus as set forth in claim 2 wherein the inner end of said tubular channelway is outwardly flared and supported from a J-shaped support member extending from said enclosure.

4. Apparatus as set forth in claim 1 including a porous, oil absorbent pad mountable within said attractor cavity.

5. Apparatus as set forth in claim 1 including ramp means mountable to the external enclosure walls for providing a walkway to at least one of said ingress apertures.

6. Apparatus as set forth in claim 5 wherein said ramp means comprises a collar member concentrically mountable about the exterior of said enclosure and flaring outwardly and away from said enclosure from a point adjacent at least one of said ingress openings and an outer edge of which extends in covering relation to a floor opening in which said enclosure is mounted.

7. Apparatus as set forth in claim 1 including means mounting to said enclosure and extensibly adjustable for supporting said enclosure between a pair of spaced apart framing members.

8. Apparatus as set forth in claim 1 wherein said attractor includes:
   (a) first and second axle members;
   (b) means for securing said first and second axle members to the opposite ends of said attractor member; and
   (c) first and second end caps mountable over exposed ends of said first and second axle members projecting from said enclosure.

9. Apparatus as set forth in claim 1 wherein said attractor member includes a plurality of raised projections extending outwardly from the body of said attractor member.

10. Apparatus as set forth in claim 3 wherein the outer end of said channelway is inwardly flared and includes means for defining the insertion depth of said channelway relative to the enclosure side wall.

11. Apparatus as set forth in claim 1 wherein said axle support means comprises first and second projections extending from the opposite ends of said attractor and first and second channeled support members secured to the inner surface of said enclosure to respectively receive and rotatably support said first and second projections.

12. Apparatus as set forth in claim 1 including at least one partially formed portion through the enclosure sidewalls having a removeable portion secured to the enclosure and defining one of said apertures upon removal.

13. A rodent trap comprising:
   (a) an enclosure having smooth side and bottom walls and a removable lid member and including a plurality of ingress apertures let through the enclosure side walls;
   (b) an attractor member including an internal cavity to which a plurality of apertures through the attractor walls open and having a cover member mounting over a portion of the cavity and providing access thereto; and
   (c) axle means for rotatably mounting said attractor to the enclosure side walls.

* * * * *